(12) United States Patent
Rajan

(10) Patent No.: US 7,463,150 B2
(45) Date of Patent: Dec. 9, 2008

(54) VEHICLE IDENTIFICATION TAG AND METHODS OF VERIFYING THE VALIDITY OF A VEHICLE IDENTIFICATION TAG

(75) Inventor: Sundar J. Rajan, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 356 days.

(21) Appl. No.: 11/264,332

(22) Filed: Oct. 28, 2005

(65) Prior Publication Data

US 2007/0096912 A1 May 3, 2007

(51) Int. Cl.
*G08B 13/14* (2006.01)

(52) U.S. Cl. .................... 340/572.1; 340/10.1; 235/375

(58) Field of Classification Search ............... 340/572.1
See application file for complete search history.

(56) References Cited

U.S. PATENT DOCUMENTS

| | | | |
|---|---|---|---|
| 4,664,966 A | 5/1987 | Bailey et al. | |
| 5,554,984 A | 9/1996 | Shigenaga et al. | |
| 5,657,008 A * | 8/1997 | Bantli | 340/933 |
| 5,661,473 A | 8/1997 | Paschal | |
| 5,725,935 A | 3/1998 | Rajan | |
| 5,847,378 A | 12/1998 | Goodwin, III | |
| 6,121,880 A | 9/2000 | Scott et al. | |
| 6,366,222 B1 | 4/2002 | Russell, Jr. | |
| 6,416,857 B1 | 7/2002 | Wright et al. | |
| 6,744,367 B1 | 6/2004 | Forster | |
| 6,758,405 B2 | 7/2004 | Look | |
| 6,876,296 B2 | 4/2005 | Talmadge et al. | |
| 6,888,509 B2 | 5/2005 | Atherton | |
| 6,894,615 B2 * | 5/2005 | Look | 340/572.1 |
| 7,034,688 B2 * | 4/2006 | Rietzler et al. | 340/572.7 |
| 7,102,522 B2 | 9/2006 | Kuhns | |
| 7,103,948 B1 | 9/2006 | Hartmann et al. | |
| 2002/0044069 A1 | 4/2002 | Jenkinson | |
| 2004/0233040 A1 | 11/2004 | Lane et al. | |

FOREIGN PATENT DOCUMENTS

WO    WO 2004/059563    7/2004

OTHER PUBLICATIONS

Brochure entitled, "Electronic Vehicle Registration", 3M Vehicle Registration Solutions, 3M Traffic Controls Materials Division, 3M Canada Company, 3M Mexico, S.A. de C.V., © 3M 2003, 6 pages.
Brochure entitled, "Electronic Vehicle Registration", Transcore, © 2003 TC IP, Ltd., 5 pages.

(Continued)

*Primary Examiner*—George A Bugg
(74) *Attorney, Agent, or Firm*—Melissa E. Buss

(57) ABSTRACT

The invention relates to a vehicle identification tag and methods of verifying the validity of a vehicle identification tag. One embodiment provides a vehicle identification tag including a first portion having a radio frequency identification ("RFID") tag and a second portion, where information on the first portion and information on the second portion assist a user in verifying that the vehicle identification tag is a valid vehicle identification tag.

10 Claims, 1 Drawing Sheet

OTHER PUBLICATIONS

Brochure entitled, "eGo™ Electronic Toll and Electronic Vehicle Registration", © 2002 TC IP, Ltd., 2 pages.

Brochure entitled, "Electronic Vehicle Registration (EVR)", Transcore, © 2003 TC IP, Ltd., 4 pages.

Technical Data, "High Tack Adhesive Transfer Tapes: 927-950-950EK", 3M Company, 3M Bonding Systems Division, Aug. 1994, 4 pages.

Technical Data, "Adhesive Transfer Tape with 3M Adhesive 400: 463-465-9457-9665", 3M Company, 3M Industrial Business, Adhesives and Tapes Division, May 2003, 2 pages.

Technical Data, "VHB™ Adhesive Transfer Tapes with Adhesive 100MP: F9460PC-F9469PC-F9473PC", 3M Company, Industrial Business, Converter Markets, Industrial Adhesives and Tapes Division, Apr. 2005, 4 pages.

* cited by examiner

VEHICLE IDENTIFICATION TAG AND METHODS OF VERIFYING THE VALIDITY OF A VEHICLE IDENTIFICATION TAG

TECHNICAL FIELD

The present invention relates to a vehicle identification tag and methods of verifying the validity of a vehicle identification tag. The present invention relates more particularly to a vehicle identification tag including a first portion having a radio frequency identification ("RFID") tag and a second portion, where information on the first portion and information on the second portion assist a user in verifying that the vehicle identification tag is a valid vehicle identification tag.

BACKGROUND OF THE INVENTION

Electronic Vehicle Registration ("EVR") is known in the art generally as an automated method of compliance screening for vehicle registration, which typically uses wireless, radio frequency identification ("RFID") technology to automatically identify vehicle compliance status using RFID readers and RFID tags to reflect vehicle information. Typically, an RFID tag is attached to a vehicle, usually the windshield. A user may use an RFID scanner to interrogate the RFID tag associated with the vehicle to obtain a unique number stored on the RFID tag. This unique number may be the unique registration number assigned to the vehicle, the unique serial number assigned to the RFID tag during manufacture, or some other unique number stored on the RFID tag which can be associated with the vehicle. Using the unique number obtained from the RFID tag, a user accesses a database, typically stored at another location, to download compliance-related information about the vehicle to which the RFID tag is assigned. Examples of compliance-related information may include vehicle registration, emissions, insurance, mechanical safety, or other factors, and whether or not the vehicle is in compliance with various national, state, or local regulations. Some EVR systems automatically process enforcement actions or violations for non-compliant vehicles. EVR tags typically supplement the traditional vehicle license plate and provide an additional, automated method for enforcing registration compliance.

Some examples of EVR systems or related RFID-tags known in the art are as follows: U.S. Pat. No. 6,894,615, U.S. Pat. No. 6,758,405, U.S. Pat. No. 5,661,473, U.S. Pat. No. 5,554,984, U.S. Pat. No. 6,366,222, U.S. Pat. No. 6,876,296, U.S. Pat. No. 6,121,880, U.S. Pat. No. 6,888,509, and U.S. Pat. Application Publication No. 2002/0044069.

One example of a two-part overlay arrangement, where one member is substantially permanently attached and another member is removably attached, is described in U.S. Pat. No. 5,847,378.

SUMMARY OF THE INVENTION

One aspect of the present invention provides a vehicle identification tag. In one embodiment, the vehicle identification tag comprises: a first portion, where the first portion comprises a radio frequency identification ("RFID") tag, where first information is stored on the RFID tag; and a second portion, where the second portion includes second information; where the first information stored on the RFID tag correlates with the second information on the second portion to allow a user to determine that the vehicle identification tag is a valid vehicle identification tag. In one embodiment of the above vehicle identification tag, the second portion of the vehicle identification tag is a renewable portion of the tag. In one aspect of this embodiment, the first portion of the vehicle identification tag is a substantially permanent portion of the tag.

In another embodiment of the above vehicle identification tag, the second information comprises alphanumeric information. In another embodiment of the above vehicle identification tag, a separate database is used to determine if the first information stored on the RFID tag correlates with the second alphanumeric information on the second portion. In another embodiment of the above vehicle identification tag, the first information stored on the RFID tag is the same as the second information on the second portion. In another embodiment of the above vehicle identification tag, the tag further comprises a first portion of adhesive having a first adhesive strength attached to the first portion of the vehicle identification tag and a second portion of adhesive having a second adhesive strength attached to the second portion of the vehicle identification tag, where the first adhesive strength is greater than the second adhesive strength. In one aspect of this embodiment, the first adhesive strength has strength sufficient to damage the RFID tag when the first portion of the vehicle identification tag is subsequently removed from the vehicle. In another aspect of this embodiment, the tag further comprises a third portion of adhesive having a third adhesive strength, where the RFID tag comprises a substrate including a first major surface and a second major surface opposite the first major surface, a radio frequency identification antenna attached to the first major surface of the substrate, an integrated circuit attached to the antenna, and where the third adhesive strength is greater than the first adhesive strength, where the third portion of adhesive is attached to the integrated circuit, and where the third adhesive strength has a strength sufficient to damage the RFID tag when the vehicle identification tag is subsequently removed from the vehicle.

In another embodiment of the above vehicle identification tag, the vehicle identification tag is in combination with a vehicle, where the first portion of the vehicle identification tag is substantially permanently attached to the vehicle, and where the second portion of the vehicle identification tag is removably attached to the vehicle. In another embodiment of the above vehicle identification tag, the second portion of the tag comprises retroreflective sheeting. In one aspect of this embodiment, the retroreflective sheeting includes printed indicia of the second information. In another embodiment of the above vehicle identification tag, the radio frequency identification tag includes printed indicia of the first information. In yet another embodiment of the above vehicle identification tag, the RFID tag is tamper evident.

Another aspect of the present invention provides methods of verifying a valid vehicle identification tag. In one embodiment, the method comprises the steps of providing a vehicle identification tag, comprising a first portion, where the first portion comprises a radio frequency identification ("RFID") tag, where first information is stored on the RFID tag, and a second portion, where the second portion includes second information, interrogating the RFID tag to obtain the first information stored on the RFID tag, reading the second information on the second portion, and verifying that the first information stored on the RFID tag correlates with the second information on the second portion. In another embodiment of the above method, if the first information stored on the RFID tag does not correlate with the second information on the second portion, then determining that the vehicle identification tag is not valid. In another embodiment of the above method, the second information comprises alphanumeric information. In another embodiment of the above method, the second portion of the vehicle identification tag is a renewable portion of the tag. In another embodiment of the above method, the first portion of the vehicle identification tag is a substantially permanent portion of the tag.

In another embodiment of the above method, the method further comprises the steps of attaching the vehicle identification tag to a vehicle, removing the renewable portion of the tag, and attaching a second renewable portion to the vehicle. In one aspect of this embodiment, the second renewable portion of the tag includes information that is different from the information on the first renewable portion of the tag. In another aspect of this embodiment, the method comprises the step of changing the first information stored on the RFID tag to correlate with the information on the second renewable portion.

In another embodiment of the above method, the method further comprises the step of providing an RFID interrogator, where the RFID interrogator performs the interrogation and the verifying steps. In another aspect of this embodiment, the RFID interrogator performs the reading step. In another embodiment of the above method, a separate database stores correlation information between the first and second information, and where the database performs the verifying step. In another embodiment of the above method, the first information stored on the RFID tag is the same as the second information on the second portion.

In another embodiment of the above method, the vehicle identification tag further comprises a first portion of adhesive having a first adhesive strength attached to the first portion of the vehicle identification tag and a second portion of adhesive having a second adhesive strength attached to the second portion of the vehicle identification tag, where the first adhesive strength is greater than the second adhesive strength. In another embodiment of the above method, the first adhesive strength has strength sufficient to damage the RFID tag when the first portion of the vehicle identification tag is subsequently removed from the vehicle. In another embodiment of the above method, the method further comprises the step of attaching the vehicle identification tag to a vehicle, where the first portion of the vehicle identification tag is substantially permanently attached to the vehicle and where the second portion of the vehicle identification tag is removably attached to the vehicle.

Certain terms are used in the description and the claims that, while for the most part are well known, may require some explanation. It should be understood that, when referring to "vehicle," this refers to any device or structure for transporting persons or things, for example, a car, truck, motorcycle, semi truck, tractor, or any similar conveyance.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

Figure 1:
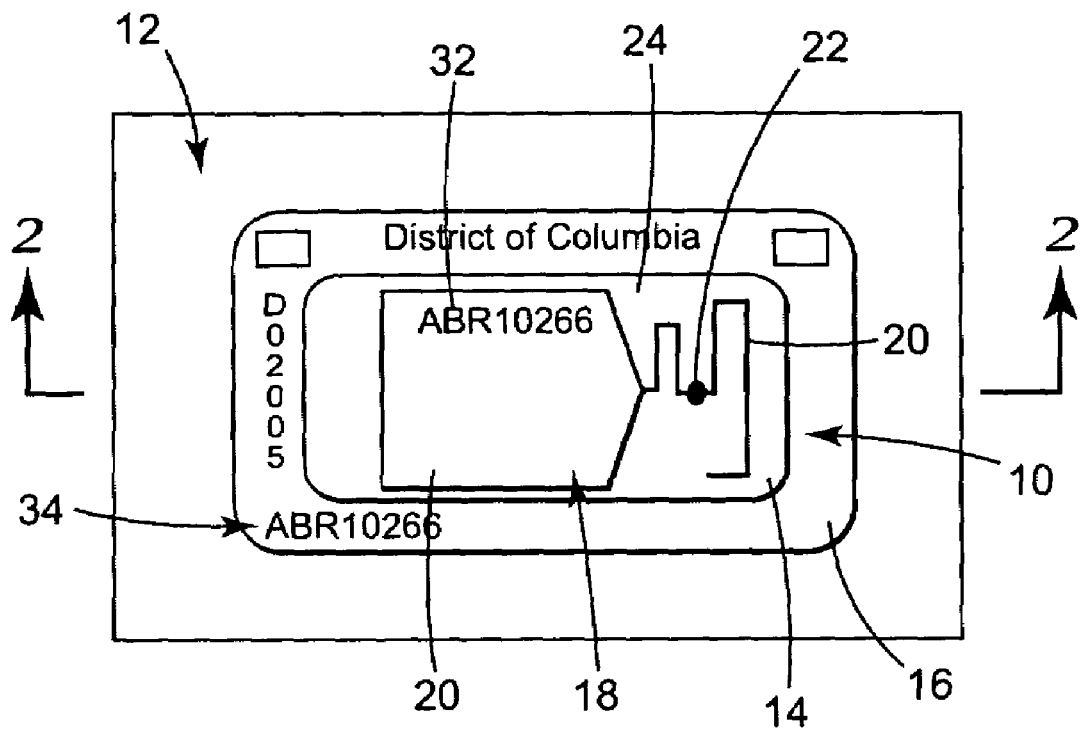
FIG. 1 is a top view of one embodiment of the vehicle identification tag of the present invention.

FIG. 1 illustrates one embodiment of a vehicle identification tag 10 of the present invention. Vehicle identification tag 10 is useful with Electronic Vehicle Registration systems, which are described briefly in the Background of the Invention section. Specifically, the vehicle identification tag 10 may assist a user in verifying or authenticating that the vehicle identification tag is a valid vehicle identification tag. By the term "valid," it is meant that the vehicle identification tag is properly issued by local, state, or federal government entities and that such tag is subsequently affiliated or otherwise attached to the vehicle to which it was issued. Typically, vehicle identification tags are issued to vehicle owners after the owners have registered their vehicles with such entities. The vehicle owner will apply the vehicle identification tag somewhere on the vehicle, such as on a window or license plate of the vehicle. It has been known that such vehicle identification tags have been stolen from the owner's vehicles and then reapplied to other vehicles, like a stolen vehicle, for instance, making the tag no longer a valid tag because it is attached to a vehicle that is different from one that it was issued to. The vehicle identification tag 10 of the present invention is directed at providing a user, typically a law enforcement agent, a way to verify that the vehicle identification tag 10 is indeed a valid vehicle identification tag 10 and that it is attached to the vehicle to which it was issued. The vehicle identification tag 10 of the present invention also provides a way to update or replace a portion of vehicle identification tag 10 with a portion that includes more current information, such as the year that the tag was issued. To accomplish this, the vehicle ID tag 10 is comprised of a first portion which is intended to remain with the vehicle for a longer period of time than a second replaceable portion of the tag. Thus the tag 10 is less expensive to maintain over the life of the tag 10. Thus, under this invention, the first portion of the vehicle ID tag, which is more expensive to make, is not required to be replaced as frequently.

Figure 2:
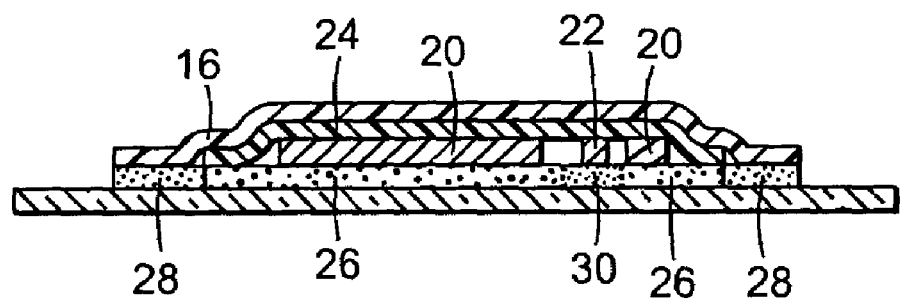
FIG. 2 is a cross sectional view taken along line 2-2 of the vehicle identification tag of FIG. 1.

The vehicle identification tag 10 illustrated in FIGS. 1 and 2 is attached to an object 12. In the illustrated embodiment, the object 12 is a portion of a glass window in a vehicle, so that a user may see through the glass and read information from the vehicle identification tag 10, either visibly or with an RFID interrogator, as explained in more detail below. However, vehicle identification tag 10 may be attached anywhere on a vehicle.

The vehicle identification tag 10 illustrated in FIGS. 1 and 2 includes a first portion 14 and a second portion 16. The first portion 14 includes a radio frequency identification ("RFID") tag 18. The RFID tag 18 includes a substrate 24 having a first major surface and a second major surface opposite the first major surface. The substrate 24 could have enough flexibility to conform to a variety of surfaces and bend easily around objects. For example, in one embodiment, the substrate 24 is preferably in the range of 25-100 microns in thickness, and is made of a flexible material, such as polyester, polyethylene naphthanate, polyimide, polypropylene, paper, or other flexible materials apparent to those skilled in the art.

An RFID element is attached to one of the major surfaces of the substrate 24. The FID element typically includes two major components: an integrated circuit 22 and an antenna 20. Some RFID tags include batteries to improve performance. These are commonly referred to as "active" tags. Passive tags do not include a battery. This invention is compatible with either type of tag. In the remainder of the description, passive tags will be assumed, unless otherwise stated. The integrated circuit 22 provides the primary identification function. It includes software and circuitry to permanently store the tag identification and other desirable information, interpret and process commands received from the interrogation hardware, respond to requests for information by the interrogator, and assist the hardware in resolving conflicts resulting from multiple tags responding to interrogation simultaneously. Optionally, the integrated circuit may provide for updating the information stored in its memory (read/write) as opposed to just reading the information out (read only). Integrated circuits suitable for use in RFID tags 18 include those available from Texas Instruments (in their line of products under the trade names TIRIS or TAG-IT), Philips (in their line of products under the trade names I-CODE, MIFARE and HITAG), among others.

The antenna 20 geometry and properties depend on the desired operating frequency of the RFID tag 18. For example, 915 MHz or 2.45 GHz RFID tags 18 might typically include a dipole antenna, such as a linear dipole antenna or a folded dipole antenna. A 13.56 MHz (or similar) RFID tag 18 would typically use a spiral or coil antenna. However, other antenna designs are known to those skilled in the art. In either case, the antenna 20 intercepts the radio frequency energy radiated by an interrogation source, such as an RFID reader. This signal energy carries both power and commands to the RFID tag 18. The antenna enables the RF-responsive element to absorb energy sufficient to power the integrated circuit 22 and thereby provide a response. Thus, the characteristics of the antenna should be matched to the system in which it is incorporated.

One example of a suitable RFID tag 18 is commercially available from TransCore LP located in Harrisburg, Pa under the "eGo" brand.

A user may use an RFID reader or interrogator to read information from or to write information to the RFID tag 18. RFID readers are well known in the art. For example, commercially available RFID readers are available from 3M Company based in St. Paul, as the 3M™ Digital Library Assistant as model numbers 702, 703, 802, and 803. Another example of a commercially available RFID reader is a model IP3 portable RFID (UHF) Reader attached to an Intermec™ 700 Series Mobile computer available from Intermec Technologies Corporation, Everett, Wash.

In one embodiment, the second portion 16 of the vehicle identification tag 10 is in contact with or overlays the first portion 14 of the vehicle identification tag 10. However, in another embodiment, the second portion 16 of the tag 10 may instead encircle the first portion 14. In this embodiment, both portions of the vehicle identification tag 10 are visible from both sides. The first portion 14 and second portion 16 of the vehicle identification tag 10 may be separate discrete portions or may be linked or integral portions. In fact, the first portion 14 and second portion 16 may be any configuration or arrangement, so long as they include the first and second information to assist in verifying that the vehicle identification tag 10 is valid, as described below.

The second portion 16 of the vehicle identification tag 10 may be made of a wide variety of materials. In one embodiment, the second portion is made from retro-reflective sheeting, such as sheeting described in U.S. Pat. Nos. 5,725,935 and 4,664,966, or sheeting which is commercially available from 3M Company based in St. Paul, Minn. as 3M™ Scotchlite™ Label Sheeting Series 5330.

The first portion 14 and second portion 16 of the vehicle identification tag 10 each contain information that assists in verifying that the first and second portions are meant to belong together on the same vehicle and that together, they form a valid vehicle identification tag 10. The RFID tag 18 of the first portion 14 of the tag 10 includes information referred to as "first information." This first information may be stored on the integrated circuit 22 of the RFID tag. The first information may be the unique serial number that is stored on the RFID tag when the RFID tag is first manufactured. Alternatively, the first information may be information that is written to the RFID tag by an RFID interrogator. The first information may contain alphanumeric information, that is, consisting of or using letters, numbers, punctuation marks, mathematical, or other conventional symbols, or any combination thereof. The first portion 14 may include printed indicia of the first information on the tag 10, such as is illustrated in FIG. 1 with reference number 32, as "ABR10266." The printed indicia of the first information may be visibly inspected by a user, as opposed to or in addition to reading the first information on the RFID tag 18 with an RFID reader or interrogator.

The second portion 16 of the tag 10 includes information referred to as "second information." This second information may be contained in the second portion 16 in any form or format. In the illustrated embodiment in FIG. 1, the second information is in the form of printed indicia with reference number 34 as "ABR10266."

When a user wants to verify that the vehicle identification tag 10 is a valid vehicle identification tag 10, he may check to see if the first information on the first portion 14 correlates with the second information on the second portion 16 of the tag 10. By the term "correlates" or "correlation," as used herein, including the claims, it is meant that there exists some form of a relationship or association between the first information and the second information. This relationship or association may be established in many ways. For instance, the first information and second information may be the same information, as is illustrated in FIG. 1. Alternatively, the first information could comprise a portion of the second information, or vice versa. For example, the first information could be "ABR10266" and the second information could be "01050ABR10266." As yet another alternative, a separate database, either stored on an RFID interrogator or at a different location, such as at the state police station, could contain a listing of vehicles, and the first and second information for each individual vehicle. Therefore, a user, such as an enforcement officer, could scan in the first information from the RFID tag 18 of the first portion 14 of the vehicle identification tag 10. That first information could then be cross-referenced against the entries in the database, and the database could provide the second information that correlates to the first information. After receiving the second information, the user could verify that the vehicle identification tag 10 is valid, if the second information obtained from the database matches the printed indicia 34 of the second information on the tag 10. Alternatively, after scanning the first information from the RFID tag 18 with the RFID interrogator, the user could enter in the RFID interrogator the second information via a keypad, and the database, either on the RFID interrogator or at another location, could verify that the first information and second information correlate and send a signal to the user that the tag is valid. If the first information and second information do not correlate, then a signal is sent to the user that the tag is not valid. As yet another alternative, if the first information is also in the form of printed indicia 32, a user could visually inspect the printed indicia 32 and see if it somehow correlated to the printed indicia 34 of the second information, without the need for an RFID interrogator to read the RFID tag 18. In contrast, prior art EVR-related tags typically include an RFID tag that includes a unique serial number on the tag, but the rest of the EVR tag does not include any "second information" that is unique to that particular tag or unique to the particular vehicle that the tag was issued for. Instead, the other information typically included on the tag is information that may be included on any number of tags issued to a variety of vehicles, such as the issuing authority or the year that the tag was issued. In this case, the "first information" and "second information" do not correlate.

After the vehicle identification tag 10 has been attached to the vehicle by its owner, the owner may update the renewable second portion 16 on a periodic basis, such as annually, when he receives his registration and license for the vehicle for the upcoming year. To do this, he removes the renewable portion 16 of the tag 10 and attaches a second renewable portion 16 to the vehicle. The second renewable portion 16 may include the same "second information" as the first portion 16 that was removed, so together the first portion 14 and second renewable portion 16 together form a valid vehicle identification tag 10. However, in the case where the second renewable portion 16 of the tag includes "second information" that is different from the "second information" on the first renewable portion 16 of the tag, a user could change the first information stored on the RFID tag 18 to correlate with the information on the second renewable portion 16. This would be achieved by writing the new information to the RFID tag 18 with an RFID interrogator. The ability to write information to RFID tags 18 with RFID interrogators is well known in the art.

The vehicle identification tag 10 may include other printed indicia that may serve any purpose. For example, the vehicle identification tag 10 could include indicia designating the source of the tag 10, such as the "District of Columbia" and the year it was issued, such as "D02005," indicating December 2005, as illustrated in FIG. 1.

FIG. 2 is convenient for describing the adhesive for attaching the vehicle identification tag 10 to the object 12. The combination of the vehicle identification tag 10 and an adhesive provides a vehicle identification sticker. In one embodiment, the adhesive for attaching the first portion 14 and second portion 16 of the vehicle identification tag 10 may be the same adhesive. In another embodiment, as illustrated in FIG. 2, the adhesive for the first portion 14 and second portion 16 of the vehicle identification tag 10 may be made of two different types of adhesive. In this embodiment, a first adhesive 26 is used to attach the first portion 14 to the object 12, and a second adhesive 28 is used to attach the second portion 16 to the object 12. The first adhesive 26 and second adhesive 28 may be a continuous layer of adhesive or two discrete portions of adhesive. In one aspect of this embodiment, the first adhesive and second adhesive may have different adhesive strengths. For example, the first adhesive may have a first adhesive strength, and the second adhesive may have a second adhesive strength. The first adhesive strength may be stronger than the second adhesive strength, making it more difficult to pull the first portion 14 of the tag 10 from the object 12 relative to pulling the second portion 16 of the tag 10 from the object. This embodiment is useful for providing a vehicle identification tag 10 where the first portion 14 is intended to remain attached to the vehicle and the second portion 16 is intended to be replaceable. For instance, the owner of the vehicle may replace the second portion 16 of the tag 10 with a new portion 16 every year to reflect an up-to-date registration. The new portion 16 may include the same information as the previous portion 16 to assist in verifying the tag 10 as a valid tag. The first portion 14 is considered a substantially permanent portion of the tag 10. That is, once it is attached to the vehicle, it is intended to stay with the vehicle for an extended period of time. In contrast, the second portion 16 may be a renewable portion of the tag 10, as mentioned above. Therefore, the first portion 14 of the vehicle identification tag 10, which is more expensive to make, compared to the second portion 16, is not required to be replaced as frequently, and the second portion 16, which is the inexpensive portion, may be replaced on a periodic basis, providing an efficient and cost effective vehicle identification tag.

The first and second portions of adhesives 26, 28 may also serve an additional purpose, to make the vehicle identification tag 10 tamper evident. When using the term "tamper evident" throughout this application, including the claims, it is meant that the vehicle identification tag 10 includes certain features which indicate to a user that that vehicle identification tag has been tampered with or otherwise compromised. This aspect is useful to a user, especially a law enforcement officer, to help indicate that the tag is not a valid tag. One way to make the vehicle identification tag 10 tamper evident is to include an adhesive that has adhesive strength sufficient to damage the RFID tag 18 when the vehicle identification tag 10 is subsequently removed from the vehicle. For example, the first to adhesive 26 may include a first adhesive that has strength sufficient to damage the RFID tag when the first portion of the vehicle identification tag is subsequently removed from the vehicle. Another way to make the vehicle identification tag 10 tamper evident is to include a third portion of adhesive 30 that is in contact with the integrated circuit 22. In this embodiment, the third adhesive 30 has an adhesive strength which is greater than the first adhesive strength of the first adhesive 26. That way, when the vehicle identification tag 10 is subsequently removed from the object 12, the integrated circuit 22 will have a tendency to remain with the object 12 and the rest of the RFID tag 18 will have a tendency to be removed from the object, thus damaging the RFID tag 18.

Alternative tamper evident features may be incorporated into the vehicle identification tag 10, such as those features described in U.S. Pat. No. 6,416,857 and U.S. Pat. No. 6,888,509, all of which are hereby incorporated by reference.

Suitable adhesives for use as adhesives 26, 28, 30 may be selected based on their adhesion strength to a surface of a vehicle, for example, glass, as well as portions of vehicle identification sticker 10. Adhesion strength of an adhesive to a given substrate may be varied 25 depending on the components used to formulate an adhesive, as known to those skilled in the art. Adhesives useful in the present invention have been described in U.S. Pat. No. 5,725,935 and one example of a suitable adhesive to use for the first adhesive 26 is commercially available from 3M Company based in St. Paul under Product Number 927. One example of a suitable adhesive to use for the second adhesive 28 is commercially available from 3M Company based in St. Paul under Product Number 9457. One example of a suitable adhesive to use for the third adhesive 30 is commercially available from 3M Company based in St. Paul under Product Number 9469. However, any number of adhesives known in the art may be used with the vehicle identification tag 10.

Although FIG. 2 illustrates attaching the vehicle identification tag 10 to an object with an adhesive, the vehicle identification tag 10 may be attached to a surface in any manner known in the art. For example, the vehicle identification tag 10 may be incorporated into a vehicle component, such as embedded in the windshield glass or the traditional license plate.

Although, the tag 10 is described herein as a vehicle identification tag, tag 10 could be used to identify objects other than vehicles. For example, tag 10 could be used to verify or identify a renewable document such as driver's license, cargo containers, railroad box cards, and so forth.

The present invention has now been described with reference to several embodiments thereof. The foregoing detailed description and examples have been given for clarity of understanding only. No unnecessary limitations are to be understood therefrom. All patents and patent applications cited herein are hereby incorporated by reference. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. A vehicle identification tag, comprising:
   a first portion, wherein the first portion comprises a radio frequency identification ("RFID") tag, wherein first information is stored on the RFID tag; and
   a second portion, wherein the second portion includes second information;
   wherein the first information stored on the RFID tag correlates with the second information on the second portion to allow a user to determine that the vehicle identification tag is a valid vehicle identification tag;
   wherein vehicle identification tag further comprises a first portion of adhesive having a first adhesive strength attached to the first portion of the vehicle identification tag and a second portion of adhesive having a second adhesive strength attached to the second portion of the vehicle identification tag, wherein the first adhesive strength is greater than the second adhesive strength.

2. The vehicle identification tag of claim 1, wherein the first adhesive strength has strength sufficient to damage the RFID tag when the first portion of the vehicle identification tag is subsequently removed from the vehicle.

3. The vehicle identification tag of claim 1 further comprising a third portion of adhesive having a third adhesive, strength, wherein the RFID tag, comprises:
   a substrate including a first major surface and a second major surface opposite the first major surface;
   a radio frequency identification antenna attached to the first major surface of the substrate; and
   an integrated circuit attached to the antenna; and
   wherein the third adhesive strength is greater than the first adhesive strength, wherein the third portion of adhesive is attached to the integrated circuit, wherein the third adhesive strength has a strength sufficient to damage the RFID tag when the vehicle identification tag is subsequently removed from the vehicle.

4. A vehicle identification tag in combination with a vehicle, comprising:
   a first portion, wherein the first portion comprises a radio frequency identification ("RFID") tag, wherein first information is stored on the RFID tag; and
   a second portion, wherein the second portion includes second information;
   wherein the first information stored on the RFID tag correlates with the second information on the second portion to allow a user to determine that the vehicle identification tag is a valid vehicle identification tag; and
   wherein the first portion of the vehicle identification tag is substantially permanently attached to the vehicle, and wherein the second portion of the vehicle identification tag is removably attached to the vehicle.

5. A method of verifying a valid vehicle identification tag, comprising the steps of:
   providing a vehicle identification tag, comprising:
      a first portion, wherein the first portion comprises a radio frequency identification ("RFID") tag, wherein first information is stored on the RFID tag; and
      a second portion, wherein the second portion includes second information;
   interrogating the RFID tag to obtain the first information stored on the RFID tag;
   reading the second information on the second portion; and
   verifying that the first information stored on the RFID tag correlates with the second information on the second portion;
      wherein the second portion of the vehicle identification tag is a renewable portion of the tag and wherein the method further comprises the steps of:
   attaching the vehicle identification tag to a vehicle;
   removing the renewable portion of the tag; and
   attaching a second renewable portion to the vehicle.

6. The method of claim 5, wherein the second renewable portion of the tag includes information that is different from the information on the first renewable portion of the tag.

7. The method of claim 5 further comprising the step of:
   changing the first information stored on the RFID tag to correlate with the information on the second renewable portion.

8. A method of verifying a valid vehicle identification tag, comprising the steps of:
   providing a vehicle identification tag, comprising:
      a first portion, wherein the first portion comprises a radio frequency identification ("RFID") tag, wherein first information is stored on the RFID tag; and
      a second portion, wherein the second portion includes second information;
   interrogating the RFID tag to obtain the first information stored on the RFID tag;
   reading the second information on the second portion; and
   verifying that the first information stored on the RFID tag correlates with the second information on the second portion;
   wherein the vehicle identification tag further comprises a first portion of adhesive having a first adhesive strength attached to the first portion of the vehicle identification tag and a second portion of adhesive having a second adhesive strength attached to the second portion of the vehicle identification tag, wherein the first adhesive strength is greater than the second adhesive strength.

9. The method of claim 8, wherein the first adhesive strength has strength sufficient to damage the RFID tag when the first portion of the vehicle identification tag is subsequently removed from the vehicle.

10. A method of verifying a valid vehicle identification tag, comprising the steps of:
    providing a vehicle identification tag, comprising:
       a first portion, wherein the first portion comprises a radio frequency identification ("RFID") tag, wherein first information is stored on the RFID tag; and
       a second portion, wherein the second portion includes second information;
    interrogating the RFID tag to obtain the first information stored on the RFID tag;
    reading the second information on the second portion; and
    verifying that the first information stored on the RFID tag correlates with the second information on the second, portion;
    wherein the method further comprises the step of attaching the vehicle identification tag to a vehicle, wherein the first portion of the vehicle identification tag is substantially permanently attached to the vehicle, and wherein the second portion of the vehicle identification tag is removably attached to the vehicle.

* * * * *

UNITED STATES PATENT AND TRADEMARK OFFICE
CERTIFICATE OF CORRECTION

| | | |
|---|---|---|
| PATENT NO. | : 7,463,150 B2 | Page 1 of 1 |
| APPLICATION NO. | : 11/264332 | |
| DATED | : December 9, 2008 | |
| INVENTOR(S) | : Sundar J Rajan | |

It is certified that error appears in the above-identified patent and that said Letters Patent is hereby corrected as shown below:

Column 4
Line 54; Delete "FID" and insert -- RFID --, therefor.

Column 6
Line 18; Delete "I0" and insert -- 10 --, therefor.

Column 8
Line 13; After "the first" delete "to".
Line 35; Before "depending" delete "25".

Column 9
Line 30; In Claim 3, after "third adhesive" delete ",".

Column 10
Line 56; In Claim 10, after "on the second" delete ",".

Signed and Sealed this
Fourth Day of October, 2011

David J. Kappos
*Director of the United States Patent and Trademark Office*